United States Patent
Charzinski et al.

(10) Patent No.: US 8,295,447 B2
(45) Date of Patent: Oct. 23, 2012

(54) METHOD FOR STORING AND FORWARDING MULTIMEDIA MESSAGES FOR MULTIMEDIA CALLS

(75) Inventors: Joachim Charzinski, Münich (DE); Walter Klausberger, Wolfpassing (AT); Jürgen Lantermann, Münich (DE); Karl Schrodi, Geretsried (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1162 days.

(21) Appl. No.: 12/067,571

(22) PCT Filed: Aug. 24, 2006

(86) PCT No.: PCT/EP2006/065637
§ 371 (c)(1),
(2), (4) Date: Jun. 16, 2008

(87) PCT Pub. No.: WO2007/054386
PCT Pub. Date: May 18, 2007

(65) Prior Publication Data
US 2009/0034699 A1    Feb. 5, 2009

(30) Foreign Application Priority Data
Sep. 21, 2005 (DE) .......................... 10 2005 045 116

(51) Int. Cl.
*H04M 11/00* (2006.01)
(52) U.S. Cl. .................................................. 379/88.13
(58) Field of Classification Search ................ 379/88.13
See application file for complete search history.

(56) References Cited

U.S. PATENT DOCUMENTS

| | | | |
|---|---|---|---|
| 2003/0152201 A1 * | 8/2003 | Snelgrove et al. | 379/88.22 |
| 2004/0121762 A1 * | 6/2004 | Chou et al. | 455/413 |
| 2006/0222152 A1 * | 10/2006 | Elias et al. | 379/88.13 |

FOREIGN PATENT DOCUMENTS

| WO | WO 03/061242 A | 7/2003 |
|---|---|---|
| WO | WO 03/079657 A | 9/2003 |
| WO | WO 2005/027485 A | 3/2005 |

\* cited by examiner

*Primary Examiner* — Alexander Jamal
(74) *Attorney, Agent, or Firm* — Laurence A. Greenberg; Werner H. Stemer; Ralph E. Locher

(57) ABSTRACT

The invention relates to a method for storing and passing on multimedia messages for a multimedia call in a packet-switching telecommunication network (TN), with the called subscriber (B subscriber) having network access with a known and predetermined bandwidth to the telecommunication network (TN). In the situation where it is found (1) during the setting up of a multimedia call that the available bandwidth is too narrow (2, 3) because the called subscriber (B subscriber) is currently using a further multimedia service, the multimedia call is diverted (4) to a recording device (ABZ) which is available in the telecommunication network (TN). A calling subscriber (A subscriber) can then leave a multimedia message on the recording device (ABZ), which is then passed (5) to a local recording device (ABL) for the called subscriber (B subscriber) via the network access and using the bandwidth that is still available. The arrival of the new multimedia message is then indicated (6) to the called subscriber (B subscriber) after complete transmission. The method according to the invention results in the subscriber (B subscriber) in a packet-switching telecommunication network (TN) being informed (6) that a multimedia call has arrived, with the recording device (ABZ) that is available in the telecommunication network (TN) advantageously carrying out a form of buffer function. This buffer function makes it possible to use time expansion to make use of the bandwidth that is still available for transmission of the multimedia message (5).

13 Claims, 1 Drawing Sheet

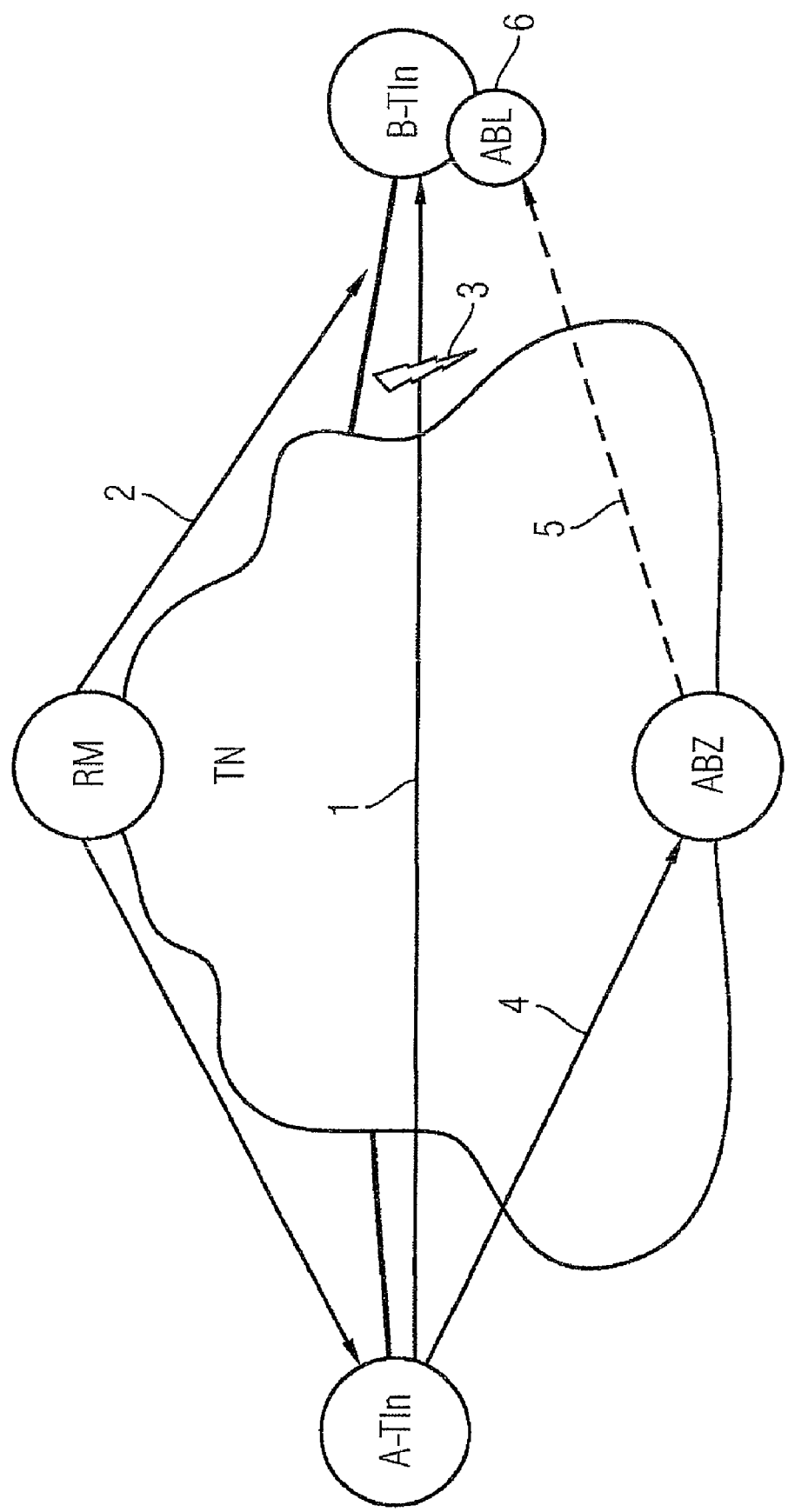

METHOD FOR STORING AND FORWARDING MULTIMEDIA MESSAGES FOR MULTIMEDIA CALLS

CLAIM FOR PRIORITY

This application is a 371 national stage of PCT/EP2006/065637, filed Aug. 24, 2006, which claims the benefit of priority to German Application No. 10 2005 045 116.0, filed Sep. 21, 2005, the contents of which are hereby incorporated by reference.

TECHNICAL FIELD OF THE INVENTION

The invention relates to a method for forwarding and storing multimedia messages for multimedia calls in a packet-switching telecommunication network to which a called subscriber has a network access with a known and predetermined bandwidth.

BACKGROUND OF THE INVENTION

The term "multimedia" denotes in the broadest sense all applications in which expediently supplementary voice, audio, text, still image and moving picture communication are integrated. A narrower definition of the term "multimedia" stipulates that at least three different contents such as, for example, text, image or sound have to be used in an application or a so-called multimedia service. Such multimedia services are e.g. Internet services such as, for example, the World Wide Web, etc. or video or audio streaming, in which video or audio data are transmitted continuously.

In addition to the ever more widespread use of the Internet—in Germany, for example, the Internet was used by 60% of the population in 2004 according to the report "Information technology in companies and households 2004" by the Federal Office of Statistics—the increasing prevalence of multimedia services in telecommunications is regarded as a driving force behind the introduction of new technologies which provide greater bandwidths for access to a telecommunication network and for the transmission of data to a subscriber.

For a line-connected network access—that is a subscriber is fixedly connected to the telecommunication network via an access line—e.g. xDSL (Digital Subscriber Line) technologies, cable modems, fiber-optic technology, etc. enable access with greater bandwidth on the subscriber's access line—a so-called broadband access—to a telecommunication network and hence the use of multimedia services with good quality.

For a wireless network access via the so-called "air interface", technologies such as e.g. universal mobile telecommunications system UMTS or the further development of UMTS, the so-called next generation network NGN in mobile radio, which is also referred to as the next generation mobile radio network, or wireless LAN are likewise offered, which are optimized for higher data transmission rates. These technologies enable the use of multimedia services such as e.g. video telephony or video streaming or access to the Internet with good quality even from mobile terminals such as e.g. mobile telephones or laptops.

Since multimedia services presuppose the multimedia data such as, for example, texts, graphics, audio or video sequences in digital form, so-called packet-switching telecommunication networks are used for transmitting said data to the access lines of the subscribers; in said telecommunication networks, a permanent, continuous channel is not made available for a connection, rather the data are transmitted in the form of packets.

Protocols are used for controlling the data communication within a packet-switching telecommunication network to the subscribers. For the transmission of data but also for the use of multimedia services, the Internet protocol IP is often used in packet-switching telecommunication networks. Packet-switching telecommunication networks which use the Internet protocol are therefore also often referred to as IP-based telecommunication networks. The best known IP-based telecommunication network is e.g. the Internet, which is the name given to the totality of all the interconnected telecommunication networks using the Internet protocol IP. In the meantime, IP-based telecommunication networks and hence the Internet protocol are also being used for the transmission of voice—for so-called IP telephony or voice-over-IP. In contrast to conventional telephony, in IP telephony the voice information is not transmitted via a switched circuit in a telecommunication network, but rather divided into data packets by the Internet protocol IP. In this case, the route through the IP-based telecommunication network, normally the Internet, is not defined.

Since the Internet in its present-day form does not guarantee an assured transmission quality between subscribers, transmission losses and dropouts can occur during IP telephony over the Internet. However, for example by prioritizing voice data packets—that is to say that these data packets are given greater preference during transmission than e.g. downloading of data from a data server or retrieval of an Internet page—it is possible to obtain a quality of service which is defined for direct communication and which permits only small delays. The quality of service—QoS—in telecommunication networks is defined and measured by means of somewhat different parameters depending on the communication standard (e.g. IP, UMTS, etc.).

In addition to IP telephony, however, some other multimedia services such as e.g. video or audio streaming, video telephony also presuppose a delay-free and continuous data transmission and a high quality of service. Therefore, a minimum bandwidth is required for the use of said multimedia services and IP telephony with good quality. If said minimum bandwidth is not available, said multimedia services can only be used with very poor quality or cannot be used at all.

If for a subscriber, then, for example when using a multimedia service such as video streaming, the bandwidth of his network access is almost completely occupied by the data transmission, further incoming multimedia calls e.g. based on IP or video telephony are rejected owing to a lack of available bandwidth. A resource management present in the packet-switching telecommunication network recognizes that the available bandwidth is insufficient for a multimedia call. Therefore, a called subscriber cannot be reached by a calling subscriber nor is he informed of an attempt to set up a multimedia call to him.

However, telecommunication networks in which the so-called time division multiplex (TDM) method is used contain functions such as "answering machine in the network" or "signaling of incoming calls via Internet protocol IP" for example, which are used while the connection to the telecommunication network is being used by the subscriber for access to the Internet.

In a packet-switching telecommunication network, in particular in IP-based telecommunication networks, however, there is e.g. only the possibility of using IP-based so-called voice mail systems, which are present centrally in the telecommunication network for recording voice messages, if the called subscriber cannot be reached. These systems then communicate a voice message by data transmission to the called subscriber. However, this procedure has the disadvantage that the voice message either has to be listened to with the quality of service or minimum bandwidth required for a delay-free and continuous data transmission or has to be transmitted to a dedicated PC-like terminal in order for it to be listened to. Therefore, these voice messages can be listened to only if the corresponding bandwidth is available to the called subscriber and is not occupied for example by the use of a multimedia service.

SUMMARY OF THE INVENTION

The present invention relates to a method by which a called subscriber in a packet-switching telecommunication network, during the use of a multimedia service, is informed of a multimedia call which cannot be set up directly on account of the excessively narrow bandwidth available.

In one embodiment according to the invention, there is a method by means of which, in the case where it is ascertained during the setting up of the multimedia call that the available bandwidth is too narrow for the multimedia call owing to a further multimedia service currently being used, the multimedia call is diverted to a recording device present in the telecommunication network. A calling subscriber then leaves a multimedia message on the recording device in the telecommunication network. This multimedia message is then forwarded to a local recording device of the called subscriber via the network access and using the bandwidth that is still available. The arrival of the new multimedia message in the local recording device is then indicated to the called subscriber after complete transmission.

In one aspect according to the invention, the fact that a subscriber who is called by means of e.g. IP telephony and has for the most part occupied the bandwidth of his network access through the use of a multimedia service is nevertheless informed of a multimedia call that cannot be set up owing to an excessively narrow bandwidth. In this case, the recording device present in the telecommunication network advantageously provides a kind of buffer function which makes it possible, by means of temporal expansion, to utilize the bandwidth that is still available for transmission of the multimedia message to a local recording device.

It is advantageous if the multimedia message is forwarded to the local recording device on the connection in best effort mode, since the best effort mode in packet-switching telecommunication networks involves forwarding data packets in accordance with transmission capacities that are still free. Best effort denotes a minimum quality of service assurance in telecommunication networks which does not guarantee errorfree and complete communication of the data. However, the data transmission e.g. in the Internet, as in many IP-based telecommunication networks, is carried out according to the best effort mode.

It is further advantageous for the complete transmission of the multimedia message into the local recording device to be indicated to the called subscriber by means of a light and/or sound signal. In this simple manner the called subscriber, during the use of another multimedia service, can be made aware of and accordingly react to the multimedia message that has arrived.

In another embodiment according to the invention, an incoming multimedia call is signaled to the called subscriber during the use of the further multimedia service, such that said subscriber can decide whether to receive the multimedia call. This means that the called subscriber has the option of deciding, depending on the importance of the multimedia call, whether to interrupt or end the further multimedia service and to accept the multimedia call or whether the multimedia call is diverted to a recording device if he does not interrupt the further multimedia service.

It is advantageous if the further multimedia service is interrupted in such a way that it can be resumed by the called subscriber after the end of the multimedia call proceeding from a point in time of the interruption, because the multimedia service can thus continue to be used by the called subscriber without any loss of information.

For the realization of this advantageous variant of the method according to the invention, a recording device for streaming applications with corresponding coupling to a service signaling is recommended for example for multimedia services such as "video streaming" or "audio streaming". Upon interruption of the multimedia service, the recording device is started in order that, after the end of the multimedia call, the transmission can be resumed proceeding from the point in time of the interruption. Further possibilities for realizing this advantageous variant of the method according to the invention, particularly when using multimedia services such as "video streaming" or "audio streaming", are e.g. a further transmission of the data stream at a correspondingly reduced rate to the called subscriber with so-called on-the-fly code conversion with respect to a rate reduction in the telecommunication network or a reduction of the transmission rate to the called subscriber without changing a streaming rate. The latter possibility involves buffering the incoming data stream in a terminal of the called subscriber and the difference of the rate in the telecommunication network. After the end of the multimedia call, the called subscriber can continue to make use of the streaming service, in which case advantageously less memory space and performance in the packet-switching telecommunication network are required overall owing to the partial local buffering of the data.

In still another embodiment of the invention, by means of an additional entry in a device for the management of subscriber data for each subscriber, the fact of whether a local recording device is operated by said subscriber is stored, and in that the operation of the local recording device is indicated by means of service signaling. As a result, if there is not enough bandwidth for setting up a multimedia call, the calling subscriber is immediately switched to the recording device if the service signaling indicates the presence of a matching recording device for the called subscriber. If no entry has been made of a recording device for the called subscriber, then e.g. a busy signal is used to indicate to the calling subscriber that the network access or bandwidth of the network access of the called subscriber is occupied.

It is advantageous if by means of an additional entry in a device for the management of subscriber data for each subscriber, the fact of whether a local recording device is operated by said subscriber is stored, in that said entry is evaluated locally, and in that, if a recording device is not operated by the called subscriber, the calling subscriber is forwarded to an arbitrary recording device present in the telecommunication network, because in this case the calling subscriber, in the event of an excessively narrow bandwidth, is always switched to a recording device in the packet-switching telecommunication network. The recorded multimedia message is then communicated to the called subscriber when the bandwidth necessary for the transmission is present again between the recording device and the called subscriber.

In yet another embodiment according to the invention, the fact that the multimedia call is diverted to the recording device in the telecommunication network which, on the basis of a metric, is determined as the recording device closest to the called subscriber in the telecommunication network and to which a connection in the QoS mode is possible, whereby the multimedia call is forwarded as far as possible with a quality of service QoS necessary for continuous and delay-free data transmission and, consequently, the probability of a successful delivery of the multimedia message from the recording device to the called subscriber is maximized in a favorable manner. Examples of parameters that can be used for the metric for determining the recording device closest to the called subscriber in the telecommunication network include spatial distance, number of network nodes, routing distance, number of intervening IP-based telecommunication networks, etc.

Still another embodiment results if the multimedia call is diverted to that recording device which is determined as close to the calling subscriber in the telecommunication network on the basis of a metric. As a result, the data packets are transmitted according to the best effort principle for the communication of the recorded multimedia message over a large part of the transmission link, whereby, in a favorable manner, the required outlay on resource signaling is minimized and the costs for forwarding the multimedia message are kept low.

In one aspect, the calling subscriber is informed of the diversion to the recording device, and then the subscriber can decide whether to use the recording device. This enquiry is useful particularly when the recording device is offered in the form of a commercial service, e.g. by charging an extra fee. In this case, it is also conceivable that for example the recording device to be used is predetermined by a fixed assignment such as e.g. by subscription of such a service to a subscriber participating in the multimedia call—that is either to the calling or to the called subscriber. It is also possible for the recording device of a further subscriber in the packet-switching telecommunication network to be made available to the other subscribers, in which case for example mechanisms and rules such as are known from peer-to-peer networks can be used for finding and for selecting such a subscriber who offers a recording device.

BRIEF DESCRIPTION OF THE DRAWINGS

The method according to the invention is explained in more detail below in an exemplary manner with reference to the accompanying FIGURE.

FIG. 1 shows an exemplary sequence of the method according to the invention in a packet-switching telecommunication network TN.

DETAILED DESCRIPTION OF THE INVENTION

FIG. 1 shows the exemplary sequence of the method according to the invention in a packet-switching telecommunication network TN. In addition to other network components not depicted in FIG. 1, the telecommunication network TN comprises a device RM for management of the resources and a recording device ABZ present centrally in the packet-switching telecommunication network TN, for example a centrally available voice mail system, video mail system, etc. for recording voice or multimedia messages.

A first and a second subscriber A-Tln, B-Tln are linked to the packet-switching telecommunication network TN via access lines with a known and predetermined bandwidth. However, there is also the possibility of the subscribers A-Tln, B-Tln being linked to the packet-switching telecommunication network TN in wireless fashion via a radio interface with a predetermined data transmission rate. In addition, the second subscriber B-Tln is provided with a local recording device ABL, e.g. an answering machine, in which voice or multimedia messages can be stored.

In a first step 1, the first subscriber A-Tln, who is also referred to hereinafter as the calling subscriber A-Tln, then attempts to reach the second subscriber B-Tln, who is also referred to hereinafter as the called subscriber B-Tln, via a multimedia call, e.g. by means of IP telephony or voice-over-IP.

In a second step 2, the device RM for resource management checks whether the bandwidth required for the multimedia call is available on the network accesses of the two subscribers A-Tln, B-Tln and in the packet-switching telecommunication network TN, in order to guarantee a quality of service for a delay-free and continuous data transmission. However, since the called subscriber B-Tln is currently using a further multimedia service such as video streaming, for example, the device RM for resource management ascertains, in a third step 3, that a large part of the bandwidth of the network access of the called subscriber B-Tln is occupied by the use of the further multimedia service and the bandwidth that is still available is no longer sufficient for setting up the multimedia call.

In a fourth step 4, therefore, the multimedia call of the calling subscriber A-Tln is diverted to the recording device ABZ available in the packet-switching telecommunication network TN in order that the calling subscriber A-Tln can leave a voice or multimedia message there for the called subscriber B-Tln. It is conceivable for the calling subscriber A-Tln, when the fourth step 4 is carried out, to be informed of the forwarding of his multimedia call to the recording device ABZ and then to be asked whether he wishes to use said recording device.

Afterward, in a fifth step 5, the voice or multimedia message is then forwarded to the local recording device ABL, which is accommodated with the called subscriber B-Tln, while utilizing the bandwidth that is still available on the network access of the called subscriber B-Tln. In a sixth step 6, the complete transmission of the voice or multimedia message to the local recording device ABL is then indicated to the called subscriber B-Tln by means of a light or sound signal. Thus, the called subscriber B-Tln is informed of the multimedia call that did not reach him and he can listen locally to the multimedia message left either after or during the use of the further multimedia service.

As an exemplary extension, a so-called multi-hop store-and-forward communication of the multimedia messages between calling subscriber A-Tln and called subscriber B-Tln is also conceivable since it is also possible for a plurality of recording devices ABZ to be accommodated in the packet-switching telecommunication network. In the case of a multi-hop store-and-forward communication, the multimedia call of the calling subscriber A-Tln can be diverted to a recording device ABZ if a bandwidth that is excessively narrow for the multimedia call is ascertained for example somewhere in the packet-switching telecommunication network TN. The multimedia message is then forwarded from said recording device ABZ to one or more recording devices until the recording device ABL of the called subscriber B-Tln is finally reached.

The invention claim is:

1. A method for storing and forwarding multimedia messages for a multimedia call in a packet-switching telecommunication network, comprising:
   providing a called subscriber with a network access with a known and predetermined bandwidth to the telecommunication network;

diverting the multimedia call to a recording device present in the telecommunication network when determined that during the setting up of the multimedia call a large part of the bandwidth of said network access of said called subscriber is occupied by the use of another multimedia service and the bandwidth of said network access, that is still available, is too narrow for the multimedia call due to the another multimedia service currently being used, wherein a calling subscriber then leaves a multimedia message on the recording device in the telecommunication network and wherein the another multimedia service is a streaming service;

forwarding the multimedia message to a local recording device of the called subscriber via the network access and using the bandwidth that remains available; and indicating the arrival of the new multimedia message in the local recording device to the called subscriber after complete transmission.

2. The method as claimed in claim 1, wherein the multimedia message is forwarded to the local recording device on the connection in best effort mode.

3. The method as claimed in claim 1, wherein the complete transmission of the multimedia message into the local recording device is indicated to the called subscriber by a light and/or sound signal.

4. A method for storing and forwarding multimedia messages for a multimedia call in a packet-switching telecommunication network, comprising:

providing a called subscriber with a network access with a known and predetermined bandwidth to the telecommunication network;

signaling an incoming multimedia call to the called subscriber during the use of another multimedia service, such that the called subscriber can decide whether to receive the multimedia call, when determined that during the setting up of the multimedia call a large part of the bandwidth of said network access of said called subscriber is occupied by the use of the another multimedia service and the bandwidth of said network access, that is still available, is too narrow for the multimedia call due to the another multimedia service currently being used;

if the called subscriber decides not to receive the multimedia call, the method further comprising:

diverting the multimedia call to a recording device present in the telecommunication network, wherein a calling subscriber then leaves a multimedia message on the recording device in the telecommunication network, forwarding the multimedia message to a local recording device of the called subscriber via the network access and using the bandwidth that remains available; and indicating the arrival of the new multimedia message in the local recording device to the called subscriber after complete transmission.

5. The method as claimed in claim 4, wherein the another multimedia service is interrupted such that it can be resumed by the called subscriber after the end of the multimedia call proceeding from a point in time of the interruption, if the called subscriber decides to receive the multimedia call.

6. The method as claimed in claim 1, which further comprises:

using an additional entry in a device for the management of subscriber data to store, for each subscriber, whether a local recording device is operated by the subscriber and indicating the operation of the local recording device by service signaling.

7. The method as claimed in claim 6, which further comprises:

diverting the multimedia call to a recording device in the telecommunication network which, on the basis of a metric, is determined as to be closest to the called subscriber in the telecommunication network and to which a connection in the QoS mode is possible.

8. The method as claimed in claim 1, wherein the multimedia call is diverted to a recording device which is determined as beinq close to the calling subscriber in the telecommunication network on the basis of a metric.

9. The method as claimed in claim 4, wherein the multimedia message is forwarded to the local recording device on the connection in best effort mode.

10. The method as claimed in claim 4, wherein the complete transmission of the multimedia message into the local recording device is indicated to the called subscriber by a light and/or sound signal.

11. The method as claimed in claim 4, wherein by using an additional entry in a device for the management of subscriber data it is stored for each subscriber, whether a local recording device is operated by the subscriber and wherein the operation of the local recording device is indicated by service signaling.

12. The method as claimed in claim 11, wherein the multimedia call is diverted to the recording device in the telecommunication network which, on the basis of a metric, is determined as the recording device closest to the called subscriber in the telecommunication network and to which a connection in a QoS mode is possible.

13. The method as claimed in claim 4, wherein the multimedia call is diverted to the recording device which is determined as close to the calling subscriber in the telecommunication network on the basis of a metric.

* * * * *